United States Patent

Hatanaka et al.

Patent Number: 5,215,551
Date of Patent: Jun. 1, 1993

[54] ALUMINA-BASED CERAMICS MATERIALS, ABRASIVE MATERIALS AND METHOD FOR THE MANUFACTURE OF THE SAME

[75] Inventors: Tetsuo Hatanaka; Tadashi Hiraiwa; Minoru Matsukura; Norimichi Aoki; Shoichi Imai, all of Shiojiri, Japan

[73] Assignee: Showa Denko K.K., Tokyo, Japan

[21] Appl. No.: 582,218

[22] PCT Filed: Feb. 1, 1990

[86] PCT No.: PCT/JP90/00124
§ 371 Date: Oct. 1, 1990
§ 102(e) Date: Oct. 1, 1990

[87] PCT Pub. No.: WO90/08744
PCT Pub. Date: Aug. 9, 1990

[30] Foreign Application Priority Data
Feb. 1, 1989 [JP] Japan ................................ 1-23010

[51] Int. Cl.$^5$ ............................ B24D 3/00; C04B 35/10
[52] U.S. Cl. ........................................ 51/293; 51/309; 501/153
[58] Field of Search ................... 51/309, 293; 501/153

[56] References Cited

U.S. PATENT DOCUMENTS

| | | | |
|---|---|---|---|
| 4,314,827 | 2/1982 | Leitheiser et al. | 51/298 |
| 4,574,003 | 3/1986 | Gerk | 51/309 |
| 4,623,364 | 11/1986 | Cottringer | 51/293 |
| 4,786,292 | 11/1988 | Janz et al. | 51/293 |
| 4,799,938 | 1/1989 | Janz et al. | 51/293 |
| 5,009,676 | 4/1991 | Rue et al. | 51/293 |

FOREIGN PATENT DOCUMENTS 39773 3/1984 Japan.
11183 1/1989 Japan.

*Primary Examiner*—Mark L. Bell
*Assistant Examiner*—Deborah Jones
*Attorney, Agent, or Firm*—Sughrue, Mion, Zinn, Macpeak & Seas

[57] ABSTRACT

An α-alumina-based ceramics material comprising crystals of a particle diameter of no greater than 0.2 μm on an average or a particle diameter of substantially no greater than 0.2 μm, and having a density of no lower than 95% of the theoretical density and a hardness of no lower than 2,000 kg/mm$^2$, and a method for the production thereof.

10 Claims, 2 Drawing Sheets

FIG. 1

FIG. 2B   Comparative Example 1

FIG. 2A   Example 2

ALUMINA-BASED CERAMICS MATERIALS, ABRASIVE MATERIALS AND METHOD FOR THE MANUFACTURE OF THE SAME

TECHNICAL FIELD

The present invention relates to improved alumina-based sintered ceramics materials which are made of ultrafine crystals produced by a sol-gel method and has a high hardness and a high density, and to abrasive materials such as abrasive grains, grinding wheels, coated abrasives as well as to their manufacture.

BACKGROUND ART

Manufacture of high-density, alumina ($Al_2O_3$)-based polycrystalline sintered ceramics abrasive grains by a sol-gel method is known. Japanese Patent Publication JP-A-56-32369 discloses gelation of alumina monohydrate together with a precursor or precursors of at least one reforming component followed by dehydration and drying as well as sintering. The reforming component used in this case includes oxides of Co, Hf, Mg, Ni, Zn, and Zr. Japanese Patent Publication JP-A-60-231462 describes a method for the manufacture of alumina sol/gel in which increase of density of alumina is promoted by the addition of α-alumina seed crystals, and also that a crystal growth control agent comprising oxides of Si, Cr, Mg, and Zr.may be added to the gel. In particular, Japanese Patent Publication JP-A-61-254685 describes a method of adding α-alumina, α-ferric oxide or their precursors as a nucleating agent into a sol, and that the gel may contain precursors of oxides of Mg, Zn, Co, Ni, Zr, Hf, Cr and Ti.

The alumina-based sintered abrasive grains produced by the sol-gel method disclosed in the above-described Japanese Patent Publication JP-A-60-231462 make use of α-aluminization of alumina-based dry gel, and further of reduction in transformation energy of α-aluminization caused by the addition of fine grains of α-alumina to an alumina sol. Sintering the dry gel at a temperature no higher than 1,400° C gives rise to a ceramics material composed of crystals of a fine structure having a particle diameter of from 0.2 to 0.4 μm and a density of no lower than 90% of the theoretical density. When the material is used as an abrasive grain, it shows grindability superior to that of a monocrystalline abrasive grain obtained by a conventional fusion method. This is considered to be ascribable to the fine crystalline structure of a particle diameter of from 0.2 to 0.4 μm.

However, ceramics materials having a fine crystalline structure of a particle diameter of no greater than 0.2 μm, a density of no lower than 90% of the theoretical density and a hardness of no lower than 16 GPa cannot be obtained by the method disclosed in Japanese Patent Publication JP-A-60-231462.

DISCLOSURE OF INVENTION

An object of the present invention is to provide a ceramics material having a density equal to or higher than that of conventional α-alumina-based ceramics material and having a fine crystalline structure of an average particle diameter of no greater than 0.2 μm and a method for the production of the same.

Keeping an eye on the fact that abrasive grains composed of a fine crystalline structure exhibit excellent grindability, the present inventors have made intensive investigation with an expectation that the finer the crystalline structure is, the more grindability increases, and as a result they have completed the present invention.

The present inventors studied on influences which the size of crystals of a sintered material might have on the strength of alumina-based sintered ceramics material and performance of abrasive grains made of it. As a result they have found that in the case where the material has characteristics, i.e., a density of no lower than 95% of the theoretical density and a Vickers hardness of no lower than 2,000 kg/mm$^2$, the strength of the ceramics material and the performances of abrasive grains made of it are increased to extremely high levels when the crystal size of the sintered material reaches a value of no higher than 0.2 μm which has never been produced earlier.

That is, the present invention provides an α-alumina-based ceramics material which is made of crystals of an average particle diameter of no greater than 0.2 μm or a particle diameter of substantially no greater than 0.2 μm, and having a density of no lower than 95% of the theoretical density and a Vickers hardness of no lower than 2,000 kg/mm$^2$.

Also, the present invention provides a method for the production of an α-alumina-based ceramics material or abrasive grain made of crystals of a particle diameter of no greater than 0.2 μm on an average or a particle diameter of substantially no greater than 0.2 μm by gelling an alumina sol containing fine α-alumina crystal grains, heating the gelled product with setting up a maximum temperature in a range of from 1,100° to 1,300° C., with time of temperature elevation from 900° to 1,100° C. on this occasion being set up to no longer than 90 seconds, and then retaining it at a temperature of from 1,000° to 1,300° C.

Furthermore, the present invention provides a method for the production of an α-alumina-based ceramics material or abrasive grain made of crystals of a particle diameter of no greater than 0.2 μm on an average or a particle diameter of substantially no greater than 0.2 μm by a two-step sintering method comprising gelling an alumina sol containing fine α-alumina crystal grains, heating the gelled product with setting up a maximum temperature in a range of from 1,100° to 1,300° C., time of temperature elevation from 900° to 1,100° C. on this occasion being set up to no longer than 90 seconds, retaining the product at a temperature in a range of from 1,100° to 1,300° C. for from 30 seconds to 10 minutes and further retaining it at a temperature of from 1,000° to 1,200° C. for 1 to 100 hours.

The abrasive grains of the present invention, either in the form of a vitrified grinding wheel or an coated abrasive, exhibit an increased strength or the like of crystals of the abrasive grains and an increased toughness of the abrasive grains as compared with conventional alumina-based sintered abrasive grains by making the crystal size no greater than 0.2 μm on an average or substantially no greater than 0.2 μm and making the crystal size uniform. As for the grindability, the abrasive grains of the present invention exhibit critical values, more specifically, by about twice when they are in the form of a vitrified grinding wheel or by about six times when they are in the form of an coated abrasive as high as the conventional highest quality alumina-based sintered abrasive grains.

BEST MODE FOR CARRYING OUT THE INVENTION

The ceramics material of the present invention can be used as an alumina-based abrasive grain, and a grinding wheel and an coated abrasive which are made of the alumina-based abrasive grain.

The above-described ceramics material, abrasive grain, grinding wheel; coated abrasive may contain in the ceramics material at least one member of oxides of Fe, Cu, Ni, Ba, Be, Mg, Cr, Si, Mn, Zr, Ti, Ca, V, Ga and Rh, or precursors thereof in an amount of no less than 20 wt % in terms of oxide.

The alumina-based sintered ceramics material does not exhibit a grindability sufficient for serving as abrasive grain unless it has a density of no lower than 95% of the theoretical density and a Vickers hardness of no lower than 2,000 kg/mm$^2$, and therefore these two characteristics are necessary for and are premises of the present invention.

Hereafter, description will be made on the method for the production of the alumina-based ceramics or abrasive grain made of crystals having a crystal size of no greater than 0.2 μm on an average or a crystal size of substantially no greater than 0.2 μm.

(Pseudo)boehmite such as SB Pural Alumina commercially available from Condea Co. is at first converted into a sol and fine α-alumina grain having a particle diameter of no greater than 0.2 μm, preferably no greater than 0.1 μm are mixed in the sol so that it can serve as a phase transformation accelerator at the time of calcination and sintering. The fine α-alumina grain which serves as a phase transformation accelerator is capable of decreasing the transition energy from a γ-form alumina to an α-form alumina upon the calcination of a gel formed by drying or the like of the sol, thereby allowing α-conversion to proceed at a low temperature, and at the same time producing a dense sintered material having a high density without causing the crystal size to grow at the time of sintering.

A method of mixing the phase transformation accelerator may be a milling treatment in which a sol or gel is treated using a ball mill, an vibratory ball mill or the like, a method in which powdery fragments of alumina balls formed by abrasion thereof as a result of idle grinding of a ball mill or the like are mixed with an alumina sol or gel, or a method in which fine powder obtained by further milling commercially available fine α-alumina powder is mixed with an alumina sol or gel.

The above-described effects are greater the finer the phase transformation accelerator is, and it is preferably a fine α-alumina grain having a particle diameter of no greater than 0.2 μm, desirably no greater than 0.1 μm. The amount of the phase transformation accelerator charged is suitably from 1 to 8 wt %, preferably in a range of from 1.5 to 3.5 wt %, based on the amount of (pseudo)boehmite as a starting material in terms of Al$_2$O$_3$. If the amount is below 1 wt %, the ceramics material produced is difficult to be dense unless its crystal size exceeds 0.2 μm. On the other hand, if the amount is above 8%, the crystal size is not so large and the density of the resulting alumina-based ceramics material is difficult to increase.

Furthermore, in the present invention, at least one member of oxides of Fe, Cu, Ni, Ba, Be, Mg, Cr, Si, Mn, Zr, Ti, Ca, V, Ga and Rh which are effective in decreasing the transition energy of the alumina-based gel from γ-form alumina to α-form alumina, and precursors and salts thereof may be added to and mixed with the alumina sol or gel in an amount of no more than 20 wt % in terms of oxide in addition to the fine α-alumina grain in order to form fine crystals of a particle diameter of no greater than 0.2 μm. If the amount is above 20 wt % in terms of oxide, the oxides would precipitate too much on grain boundaries of the alumina-based ceramics material as a final product, resulting in that the hardness of the ceramics material is decreased.

As for the method for the addition and mixing of the above-described oxides, precursors and salts thereof with the alumina sol or gel, a method in which an in-line mixer is used can be used besides a method using stirring. A preferred method is ball mill mixing, and in addition the use of alumina balls on this occasion is advantageous because powdery fragments of α-alumina produced as a result of abrasion of the balls themselves are mixed and the mixing is carried out sufficiently. Particularly, when the above elements are added in the form of salts, mixing cannot be performed sufficiently for achieving uniform addition and mixing unless a ball mill or vibratory ball mill is used because the alumina sol is gelled.

In addition, the above-described precursors mean alkoxides or intermediate products and the like formed during conversion to oxides. As for the salts of the precursors, there can be used nitrates, chlorides, carbonates, acetates, sulfides and the like.

After stirring sufficiently for from 1 to 4 hours in the case of the alumina sol containing a fine α-alumina grain, or after stirring sufficiently in the case where the alumina sol has been gelled, it is slowly dried at a temperature of from 80° to 120° C. for from 10 to 72 hours. The reason why it is dried slowly is that while the sol is gelled by drying, including cases where the sol has been gelled before drying, air bubbles contained in the gel is to be removed sufficiently to render the density higher. If the temperature of drying is below 80° C., the efficiency of drying is low. On the other hand, the alumina gel dried at above 120° C. cannot be converted into a sol again and therefore it is impossible to reuse grains with unnecessary sizes when producing abrasive grains.

In the case where abrasive grains are produced according to the present invention, the above-described dry gel is crushed so as to have a particle size coarser than the objective particle size taking its degree of shrinkage upon sintering and subjected to particle size arrangement to produce dry grain with a predetermined particle size, which then is subjected to a subsequent calcination step. Dry grains with unnecessary particle diameters can be converted to a sol again by adding thereto an acid and therefore they can be reused by feeding back to a preceding sol formation step.

It is preferred to calcine the dry gel at from 500° to 900° C. for about 1 hour in order to remove the acid used for the sol formation.

Thereafter, the alumina-based gel is heated in an furnace such as rotary kiln or the like. The heating is carried out with setting up a maximum temperature in a range of from 1,100° to 1,300° C. On this occasion, the heating in a temperature range of from 900° to 1,100° C. is processed rapidly within 90 seconds.

The rapid heating causes the phase transformation of from a γ-form alumina to an α-form alumina to proceed rapidly and accelerates rendering the density higher and increases its hardness.

According to the method of the present invention, the alumina gel is subjected to the rapid heat treatment for the above-described temperature range and the maximum temperature is set up at from 1,100° to 1,300° C., and thereafter, retained at a temperature of from 1,000° to 1,300° C. The retention time at this temperature is shorter the higher the temperature is, and is suitably about 30 seconds at 1,300° C. and about 100 hours at 1,000° C. Preferred retention time is from 30 seconds to 10 minutes in the case where the retention temperature is in a range of from 1,200° to 1,300° C., and from 10 minutes to 10 hours in the case where the retention temperature is in a range of from 1,100° to 1,200° C., and from 10 to 100 hours in the case where the retention temperature is in a range of from 1,000° to 1,100° C. A more preferred heat treatment method is a two-step sintering method such as the one which includes retention at a temperature in a range of from 1,100° to 1,300° C. for from 30 seconds to 10 minutes followed by further retention at a temperature of from 1,000° to 1,200° C. for from 1 to 100 hours. This method gives a crystal size of substantially no greater than 0.2 μm, and a uniform crystal size as well as a high hardness.

According to the methods, a ceramics material can be obtained whose crystal size is no greater than 0.2 μm on an average or substantially no greater than 0.2 μm, and which has a density of no lower than 95% of the theoretical density and a Vickers hardness of no lower than 2,000 kg/mm$^2$. As for the hardness, the one which has a hardness of no lower than 2,300 kg/mm$^2$ is also possible.

The reason why the maximum temperature is set up to from 1,100° to 1,300° C. is that if the maximum temperature is above 1,300° C., the hardness becomes no lower than 2,000 kg/mm$^2$ but it is difficult to make the crystal size no greater than a predetermined value, i.e., no greater than 0.2 μm on an average even when the rapid heat treatment is carried out, and on the other hand, because if the maximum temperature is below 1,100° C., the crystal size becomes no greater than 0.2 μm on an average or substantially no greater than 0.2 μm but the hardness is no higher than 1,800 kg/mm$^2$ and only a ceramics material can be obtained that has a density lower than 95% of the theoretical density. Heat treatment in which the gel is retained at a temperature below 1,000° C. fails to increase the hardness and density.

The reason why the above-described two-step sintering method is an excellent heat treatment method is that the density can be increased while suppressing the growth of the crystal grains and the hardness and the strength can be increased further due to an annealing effect which reduces crystal distortion by rapidly calcining and sintering the gel in a relatively high temperature range (first step) and then retaining it for a long period of time in a relatively low temperature range such that the crystal size does not grow extremely (second step).

Actually, an electron micrograph (FIG. 2) of crystal grains of the abrasive grain obtained according to Example 5 described later on shows that not only the crystal size is uniform but also the shape of the crystals is uniform.

While the amount of the phase transformation accelerator used in the present invention is from 1 to 8 wt %, preferably from 1.5 to 3.5 wt % based on the weight of the (pseudo)boehmite in terms of $Al_2O_3$, as described above, it is preferred to elevate the temperature of sintering when the amount is large. This is because when the amount is large, the sintering property is aggravated, resulting in that the density and hardness do not increase; when it is added in an amount of no less than 3.5 wt %, the temperature of sintering must be elevated by from 20° C. to 50° C.

As described above, it is by the present invention that a ceramics material or abrasive grain having a crystal size of no greater than 0.2 μm on an average or substantially no greater than 0.2 μm, and having a density of no lower than 95% of the theoretical density and a Vickers hardness of no lower than 2,000 kg/mm$^2$ that has not hitherto been produced can be produced for the first time, and furthermore, increase of the strength upon actual use is achieved because the crystal size is very small and uniform. Particularly, in the case of abrasive grains, results are obtained in which the grinding ratio is increased by no less than twice as will be described later on in examples. Particularly, abrasive grains which are more excellent in these characteristics can be obtained by the two-step sintering method.

In the case of abrasive grain, the grain sintered in a single step or in two steps are cooled down to room temperature and then sorted again by sieving or the like so as to have a predetermined particle size to obtain an abrasive grain having an objective particle size.

The grinding wheel of the present invention is produced by molding and curing the above-described abrasive grain with a binder such as a vitrified bond, a metal bond or a resin bond. Particularly, the grinding wheel produced using a vitrified bond well exhibits the feature of the abrasive grain of the present invention.

The binder used in the vitrified bond grinding wheel, which is an appropriate mixture of feldspar, pottery stone, borax, clay and the like, is generally called frit and its components include $SiO_2$, $B_2O_3$, $Al_2O_3$, $Fe_2O_3$, CaO, MgO, $Na_2O$, $K_2O$ and the like. The vitrified grinding wheel is produced by adding a certain amount of a paste such as dextrin to such binder and mixing the resulting composition with an abrasive grain, press molding and drying the mixture, followed by firing it. In the present invention, the temperature of sintering is preferably from 950° to 1,150° C. least the crystal size of the abrasive grain should become coarse.

Coated abrasives are produced by bonding a backing and the abrasive grain with an adhesive. As the adhesive, a phenol resin-based adhesive is mostly used in view of excellent grinding characteristics and water resistance. Simultaneous use of resorcinol or its derivatives can alleviate its curing conditions.

As for the backing, there can be cited, for example, paper, woven fabric, and non-woven fabric.

EXAMPLES

Hereafter, the present invention will be explained in detail with reference to examples.

EXAMPLES 1 TO 4

Two hundred grams (200 g) of (pseudo)boehmite such as SB Pural Alumina marketed by Condea Co. and 1.5 liters of water were mixed in a beaker. Next, to produce a sol, 0.3 liter of 3.6 wt % $HNO_3$ was added to adjust pH to 2. Then 7 kg of alumina balls and 1.5 liters of water were put into a 7.3-liter alumina pot, and milling was performed in a state of idle grinding for 96 hours to produce a slurry containing mainly powdery fragments formed as a result of abrasion of the alumina balls. The specific surface area of the powdery fragments was 75 m$^2$/g.

Next, the slurry containing the powdery fragments was added to the alumina sol prepared as above in such an amount that the powdery fragments constituted 1.5 wt % of the alumina ($Al_2O_3$). After 2 hours of stirring, the sol was transferred to a vat, and dried first at 80° C. for 48 hours, then at 120° C. for 24 hours. After the drying, the dry gel was crushed in a mortar and sieved to a maximum grain diameter of 500 μm and a minimum grain diameter of 350 μm. The sintering dry gel was treated at 750° C. for 1 hour to remove the $NO_x$ contained in the nitric acid, and then heated rapidly in a rotary kiln to four levels of calcination temperature of 1,150° C., 1,200° C., 1,250° C. and 1,300° C. and retained at those temperatures for 2 minutes, followed by a heat treatment at 1,150° C. for 10 hours. The grains after the first and second sintering steps, respectively, were measured for a Vickers hardness under a load of 500 g, a crystal size by SEM and a density. The results obtained are shown in Table 1.

The size of the grains, after the sintering, of abrasive grain in a range of from 350 to 250 μm corresponds to #60 according to JIS R6001-1973.

Comparative Example 1

The same procedures as in Example 1 were repeated until the drying and sieving of the dry gel into from 500 to 350 μm, and the removal of $NO_x$. Thereafter, the dry gel was sintered in a rotary kiln at 1,400° C. for 1 minutes according to Japanese Patent Publication JP-A-60-231462. The time taken to raise the temperature to 1,400° C. was 15 minutes.

The crystal size of the sintered particles, i.e., abrasive grain, was from 0.2 to 0.5 μm and 0.3 μm on an average; the Vickers hardness at a load of 500 g was 2,230 kg/mm$^2$; and the density was 3.89 g/cm$^3$, i.e., 98% of the theoretical density. On the other hand, as will be apparent from Table 1, the abrasive grains of Examples 1 to 4 each had a Vickers hardness of no lower than 2,000 kg/mm$^2$ and a density at least equal to that of the abrasive grain of Comparative Example 1. In addition, they were fine, having an average particle diameter of no greater than 0.2 μm.

TABLE 1

| Sample | | Vickers Hardness H$_{v500}$ (kg/mm$^2$) | Density (g/cm$^3$) | Crystal Size (μm) Average Particle Diameter | Range |
|---|---|---|---|---|---|
| Example 1 | After 1st Sintering | 1,340 | 3.12 | 0.08 | 0.03–0.12 |
| | After 2nd Sintering | 2,120 | 3.89 | 0.18 | 0.05–0.20 |
| Example 2 | After 1st Sintering | 1,490 | 3.58 | 0.12 | 0.07–0.15 |
| | After 2nd Sintering | 2,140 | 3.90 | 0.18 | 0.10–0.22 |
| Example 3 | After 1st Sinterinq | 2,250 | 3.86 | 0.15 | 0.07–0.20 |
| | After 2nd Sintering | 2,460 | 3.92 | 0.20 | 0.10–0.30 |
| Example 4 | After 1st Sintering | 2,280 | 3.87 | 0.19 | 0.17–0.25 |
| | After 2nd Sintering | 2,390 | 3.91 | 0.20 | 0.10–0.30 |

EXAMPLE 5 AND COMPARATIVE EXAMPLE 2

Figure 2A:
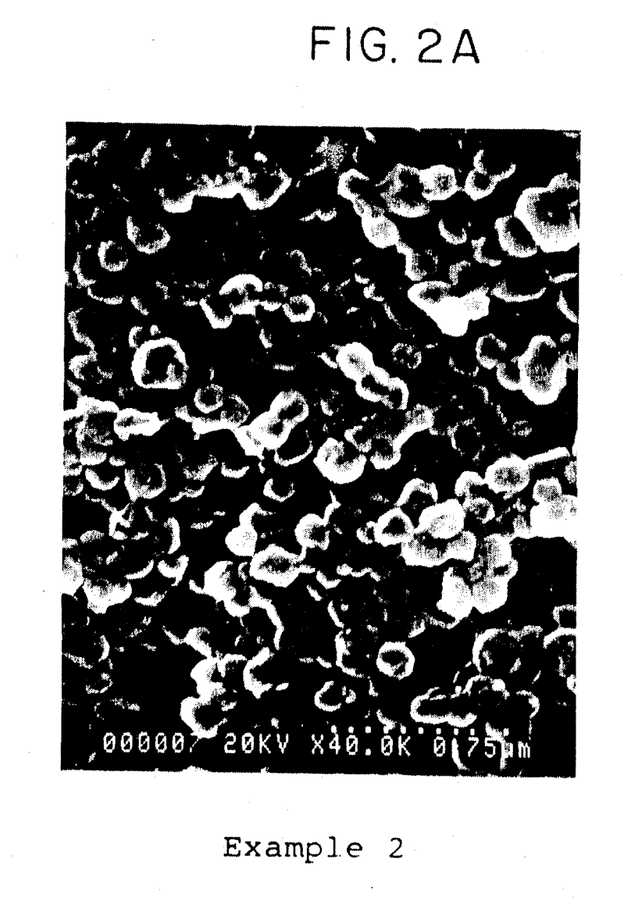
FIG. 2 is electron micrographs taken according to Example 5 and Comparative Example 2 of crystal grains of the abrasive grains produced according to Example 2 and Comparative Example 1, respectively.
Figure 2B:
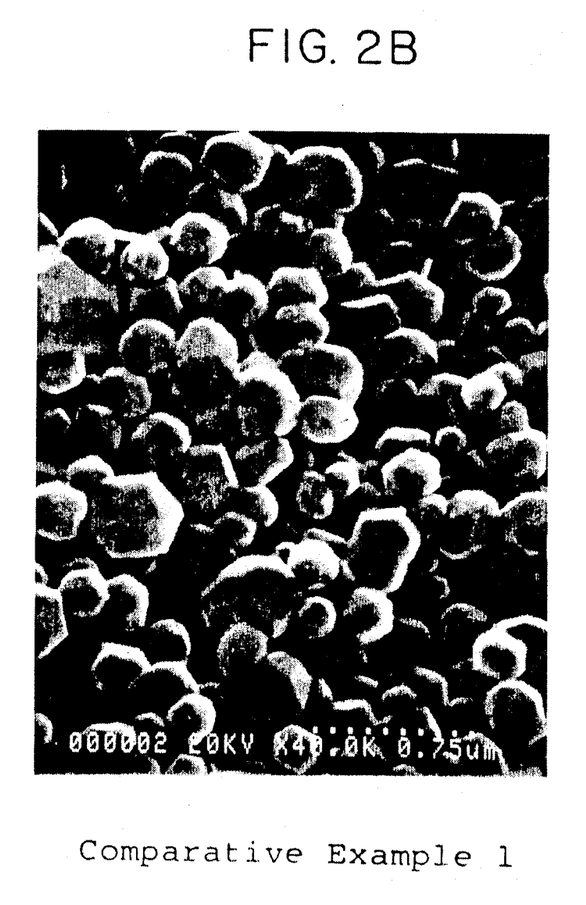

Measurement of crystal size distribution was made on the abrasive grain of Example 2 (FIG. 2A) and that of Comparative Example 1 (FIG. 2B).

The measurement was conducted as follows. That is, the abrasive grains prepared according to the example and the comparative example were dipped in a saturated aqueous solution of borax ($Na_2B_4O_7.10H_2O$) at 80° C., taken out from the solution, charged in a mullite boat and etched with heating at 900° C. for 30 minutes. After cooling down to room temperature, the grains were boiled with 12 wt % hydrochloric acid to wash out the resulting glass. After washing with water and drying, the thus-treated grains were taken an SEM photograph at a magnification of 40,000 times and measured for their particle diameter.

Particle diameter data were obtained on 473 and 452 crystal grains, respectively, of the abrasive grains of Example 2 (FIG. 2A) and Comparative Example 1 (FIG. 2B).

The abrasive grain of Example 2 had an average particle diameter of 0.176 μm with s standard deviation of 0.028. On the other hand, the abrasive grain of Comparative Example 1 had an average particle diameter of 0.309 μm with a standard deviation of 0.077.

Figure 1:
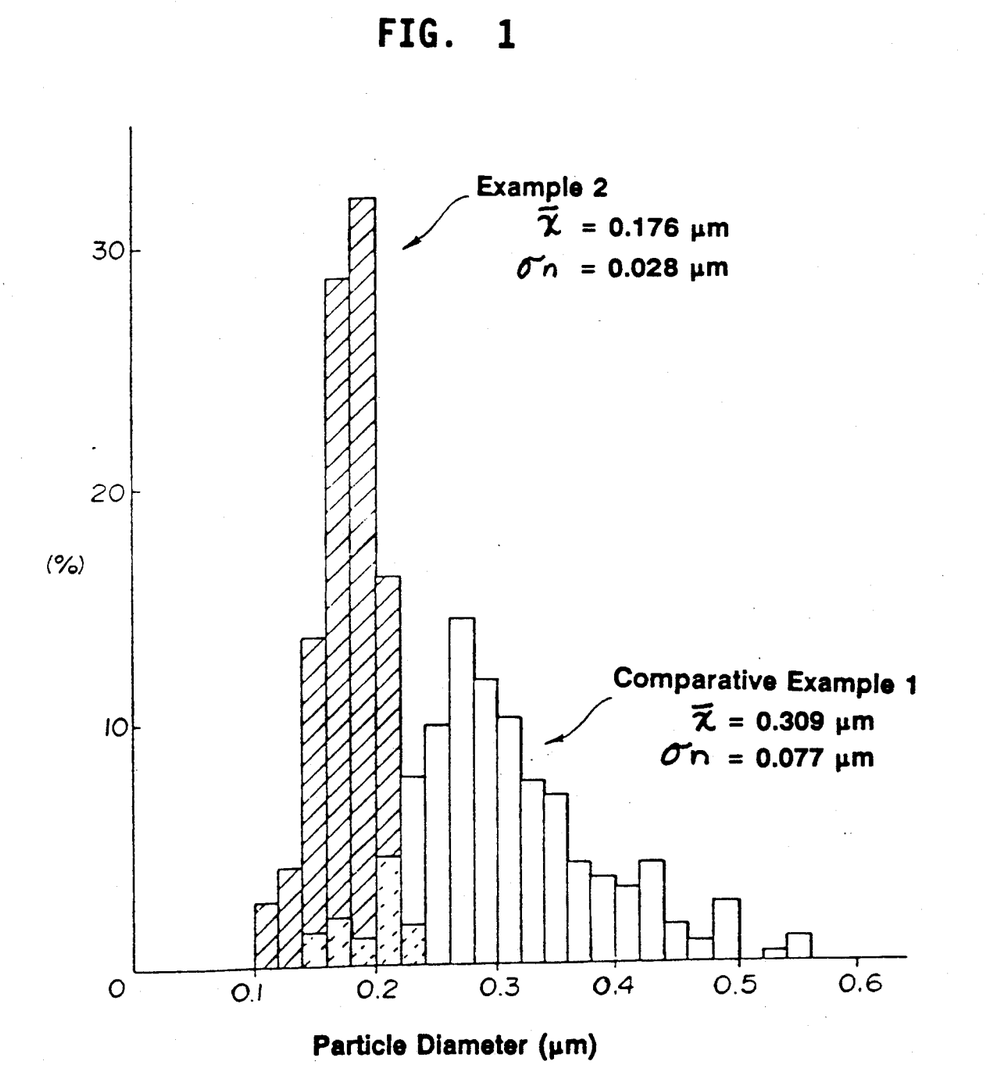
FIG. 1 is a graph showing crystal particle diameter distributions obtained by measurements according to Example 5 and Comparative Example 2 of abrasive grains produced according to Example 2 and Comparative Example 1.

FIG. 1 illustrates a crystal particle diameter distribution. As will be apparent from FIG. 1 and the standard deviation, the abrasive grain of Example 2, the present invention, had a particle diameter substantially no greater than 0.2 μm and thus had a uniform crystal particle diameter.

When the maximum temperature was set up at no lower than 1,300° C., the growth of grains was promoted so that grains with high growth rates had particle diameters of no smaller than 0.5 μm, which makes the distribution of particle diameter broader. In the case of the the particle diameter distribution of the crystals of the abrasive grain obtained in Comparative Example 1, those grains having a particle diameter of no smaller than 0.5 μm occupied about 2% while in Example 2, there was observed no grain that had a particle diameter of no smaller than 0.3 μm.

FIGS. 2A and 2B are electron micrographs of crystal grains of the abrasive grains as noted above. From these figures, can been seen that the abrasive grain of Example 2 had not only a uniform particle diameter but also a uniform crystal shape. On the contrary, the abrasive grain of Comparative Example 1 was composed of larger grains scattered in smaller grains, thus showing that not only the crystal particle diameter is non-uniform but also the shape of the crystals is non-uniform.

EXAMPLES 6 TO 7

The same procedures as in Example 1 were repeated until the drying and sieving of the dry gel into from 860 to 1,410 μm, and the removal of $NO_x$. Thereafter, the dry gel was heated rapidly from room temperature to two levels of calcination temperature, i.e., 1,200° C. and 1,350° C., in 60 seconds and kept at those temperatures for 2 minutes followed by heating at 1,100° C. for 60 hours, thus performing two-step calcination.

Table 2 shows the Vickers hardness at a load of 500 g of the resulting grains, i.e., abrasive grain, the crystal size by SEM photography and density measured. The particle size of the abrasive grain was #24.

EXAMPLES 8 AND 9

SB Pural Alumina (5.0 kg) produced by Condea Co. was mixed and dispersed in 42 liters of water in a 65 liter container equipped with a stirrer. Then, 1.8 liters of 17 wt % $HNO_3$ was added thereto to obtain a boehmite sol.

Slurry (1.0 kg) containing 10 wt % of fine powdery fragments mainly as a result of the wear of alumina balls themselves as described in Examples 1 to 4 was added to the sol, and the mixture was mixed well. The $Al_2O_3$ fine powder used then had a specific surface area of 112 $m^2/g$. The sol thus obtained was transferred to a stainless steel vat and dried for a total time of 48 hours, more specifically at 100° C. for 24 hours and then at 120° C. for 24 hours, to obtain a gel. After completion of the drying, the gel was crushed with a roll breaker and sieved with a sieve so as to have a particle diameter of from 500 to 350 μm. The particles were calcined at 750° C. for 1 hour to remove moisture and $NO_x$.

The temperature of the particles were raised to two levels of calcination temperature, i.e., 1,250° C. and 1,300° C., in 60 seconds and kept at the respective temperatures for 1 minute, followed by heating at 1,100° C. for 40 hours.

Table 2 shows the Vickers hardness, density and crystal size of each abrasive grain.

EXAMPLES 10 AND 11

A boehmite sol was prepared in the same manner as in Examples 1 to 4, and then $Mg(NO).6H_2O$ was added thereto so that MgO was contained in an amount of 0.7 wt % based on the weight of $Al_2O_3$. Thereafter, a slurry of powdery fragments was added thereto in the same manner as in Examples 1 to 4, and the mixture was dried to obtain a gel, which was sieved to a particle diameter of from 500 to 350 μm and calcined at 750° C. for 1 hour. Then, the temperature was raised in 60 seconds from room temperature to 1,150° C. and kept at 1,150° C. for 10 hours and further treated at 1,100° C. and 1,150° C., respectively, each for 10 hours, to obtain two kinds of abrasive grains. Table 2 shows the Vickers hardness, density and crystal size of each abrasive grain.

TABLE 2

|  | Vickers Hardness HV500 (kg/mm$^2$) | Density (g/cm$^3$) | Crystal Size (μm) | |
|---|---|---|---|---|
|  |  |  | Mean Particle Diameter | Range |
| Example 6 | 2,110 | 3.89 | 0.16 | 0.08–0.20 |
| Example 7 | 2,290 | 3.90 | 0.18 | 0.10–0.22 |
| Example 8 | 2,330 | 3.90 | 0.14 | 0.10–0.16 |
| Example 9 | 2,380 | 3.91 | 0.12 | 0.08–0.15 |
| Example 10 | 2,230 | 3.88 | 0.16 | 0.08–0.20 |
| Example 11 | 2,320 | 3.92 | 0.18 | 0.08–0.22 |

EXAMPLES 12 AND 13 AND COMPARATIVE EXAMPLES 3 AND 4

γ-Alumina grains obtained by treating the dry gel prepared in the same manner as in Example 1 at 750° C. for 1 hour were heated from room temperature to 900° C. in 1 hour and then calcined by changing time required for elevating the temperature from 900° C. to 1,100° C. as shown in Table 3, followed by elevation of the temperature from 1,100° C. to 1,250° C. in 5 minutes, keeping at 1,250° C. for 2 minutes and then heating at 1,150° C. for 10 hours. Table 3 shows results of measurements on the Vickers hardness at a load of 500 g, density and particle diameter by SEM photography of each grain product.

TABLE 3

|  | Time for elevating temperature from 900 to 1,100° C. (seconds) | Vickers Hardness $H_{V500}$ (kg/mm$^2$) | Density (g/cm$^3$) | Crystal size: Average particle size (μm) |
|---|---|---|---|---|
| Example 12 | 30 | 2,360 | 3.90 | 0.2 |
| Example 13 | 80 | 2,180 | 3.85 | 0.2 |
| Comparative Example 12 | 120 | 1,750 | 3.76 | 0.2 |
| Comparative Example 12 | 600 | 1,380 | 3.12 | 0.3 |

γ-Alumina prepared by removing water and NOx from alumina-based gel containing from 1 to 8 wt % of fine grains of $\alpha$-$Al_2O_3$ is transformed to $\alpha$-$Al_2O_3$ at from 900° to 1,100° C. By rendering the range of transformation temperature steeper or rendering the transformation time within 90 seconds as will be understood from Table 3, more sites of formation of $\alpha$-$Al_2O_3$ nuclei are obtained, resulting in that the particle diameter of crystals becomes smaller and densities of the grains become higher.

EXAMPLES 14 AND 15 AND COMPARATIVE EXAMPLES 5 AND 6

The abrasive grain after the first step sintering prepared in Example 1 was heated at 900° C., 1,000° C., 1,200° C. and 1,350° C., respectively, for from 1 to 100 hours as shown in Table 4, and the results obtained are shown in Table 4.

TABLE 4

|  | Comparative Example 5 | Example 14 | Example 15 | Comparative Example 6 |
|---|---|---|---|---|
| Temperature and Time | 900° C. 100 hrs. | 1,100° C. 50 hrs. | 1,250° C. 1 hr. | 1,350° C. 30 min. |
| Vickers Hardness $H_{V500}$ (kg/mm$^2$) | 1,380 | 2,180 | 2,250 | 2,130 |
| Density (g/cm$^3$) | 3.20 | 3.89 | 3.90 | 3.94 |
| Crystal size: Average particle Diameter (μm) | 0.08 | 0.18 | 0.20 | 0.32 |

It is understood from Table 4 that the heat treatment had an effect of increasing the density and hardness that had not increased in the first step calcination to a necessary value without causing excessive growth of crystal grains.

COMPARATIVE EXAMPLES 7 TO 12

Grains prepared in the same manner as in Examples 1 to 4 up until the removal of moisture and NOx were heated to increase the temperature from room temperature to 1,050° C. in 60 seconds. After keeping them at 1,050° C. for 2 minutes, the grains were heated at 1,150° C. for 10 hours, at 1,250° C. for 1 or 10 hours, and at 1,300° C. for 0.5 or 2 hours. Table 5 shows results of measurements on the Vickers hardness, density and particle diameter of each grain product.

TABLE 5

|  | Only Sintering at 1,050° C. | Conditions of Second-Step Sintering |  |  |  |  |
|---|---|---|---|---|---|---|
|  |  | 1,150° C. 100 hrs | 1,250° C. 1 hr | 1,250° C. 10 hrs | 1,300° C. 0.5 hr | 1,300° C. 2 hrs |
| Vickers Hardness $H_{v500}$ (kg/mm$^2$) | 280 | 800 | 1,460 | 1,950 | 1,880 | 2,030 |
| Density (g/cm$^3$) | 2.80 | 3.10 | 3.70 | 3.80 | 3.81 | 3.85 |
| Crystal Size: Average Particle Diameter (μm) | <0.05 | 0.15 | 0.20 | 0.23 | 0.22 | 0.26 |
|  | Comp. Ex. 7 | Comp. Ex. 8 | Comp. Ex. 9 | Comp. Ex. 10 | Comp. Ex. 11 | Comp. Ex. 12 |

As will e understood from Table 5, if the sintering temperature in the first step is below 1,100° C., increases of density and hardness are insufficient and the density and hardness will not increase by the subsequent heat treatment at from 1,000° C. to 1,300° C. or if they increase growth of grains takes place because of prolonged retention at a high temperature so that a crystal grain structure having a particle diameter of no greater than 0.2 μm cannot be obtained.

In the runs of Examples 1 to 4 which include only the first step sintering (Table 1), the retention time was 2 minutes. On the other hand, those runs in which only the first step sintering of Examples 1 and 2 at a temperature of 1,150° C. or 1,200° C. was carried out but retention at a temperature of from 1,000° C. to 1,300° C. was not performed gave no density nor hardness that were on practically acceptable levels.

Comparative Example 13

Grains prepared in the same manner as in Examples 1 to 4 up until the removal of moisture and NOx were heated to increase the temperature from room temperature to 1,350° C. in 60 seconds. After keeping them at 1,350° C. for 2 minutes, the grains had a Vickers hardness of 2,260 kg/mm$^2$, a density of 3.90 g/cm$^3$, and an average particle diameter of 0.27 μm.

EXAMPLE 16 AND COMPARATIVE EXAMPLES 14 TO 18

Temperature was raised from room temperature to a predetermined temperature in 60 seconds in the same manner as in Comparative Example 13 and immediately after the predetermined temperature was reached, the temperature was decreased. Table 6 shows the characteristics of the respective abrasive grains.

TABLE 6

|  | Comp. Ex. 14 | Comp. Ex. 15 | Comp. Ex. 16 | Comp. Ex. 17 | Example 16 | Comp. Ex. 18 |
|---|---|---|---|---|---|---|
| Temperature (°C.) | 1,050 | 1,150 | 1,200 | 1,250 | 1,300 | 1,350 |
| Vickers Hardness (kg/mm$^2$) | <200 | 480 | 1,220 | 1,980 | 2,030 | 2,120 |
| Density (g/cm$^3$) | 2.30 | 2.90 | 3.05 | 3.78 | 3.80 | 3.83 |
| Crystal Size (μm) | <0.05 | <0.05 | 0.07 | 0.13 | 0.18 | 0.24 |

The results of Comparative Example 13 in Table 6 indicate that 1,350° C. is unsuitable for the maximum temperature for sintering.

EXAMPLES 17 TO 20

π60 Abrasive grains (100 parts) of Example 3, 4, 8 or 11 were each mixed with 13 parts of borosilicate frit serving as a bond for vitrified grinding wheels, 12 parts of dextrin and 2.5 parts of water using a mixer. The borosilicate frit used was composed of 70% $SiO_2$, 7% $Al_2O_3$, 18% $B_2O_3$, 4% $Na_2O+K_2O$, and 0.5% $CaO+MgO$.

After the mixing, the mixture was formed using a press and the formed material having an abrasive grain content of 45% was dried at 110° C., followed by heating at 1,050° C. for 20 hours. Upon cooling, cooling was performed slowly by leaving it to stand in a range of from 500° C. to 600° C. In this manner, vitrified grinding wheel having a degree of bond of K as specified in JIS R6210 were produced. The grinding wheel produced from the abrasive grains of Examples 3, 4, 8 and 11, respectively, were referenced as Examples 17, 18, 19 and 20, respectively. For example, the grinding wheel of Example 17 was indicated as SF (3) 60K V. The sizes of the grinding wheel of Examples 17 to 20 were each 200 mm × 19 mm × 76.2 mm.

COMPARATIVE EXAMPLES 19 TO 20

In relation to the #60 abrasive grain in comparative Example 1 and the #60 single crystal alumina abrasive grain 32A made by Norton, Inc., vitrified grinding wheel measuring 200 × 19 × 76.2 mm were produced in the same manner as in Examples 17 to 20, and are named as Comparative Examples 19 and 20, respectively.

EXAMPLE 21

The grindabilities of the vitrified grinding wheel of Examples 17 to 20 and Comparative Examples 19 and 20 were evaluated under the following test conditions.

TABLE 7

| Test Conditions | |
|---|---|
| Machine: | Okamoto Heiken, CFG-52 (3.7 kw) |
| Grinding System: | Plunge cut, down cut, manual cut |
| Work: | SDK-1 (HRC 60) $^L100 \times {}^h50 \times {}^t10$ |
| Grinding wheel surface speed: | 2,000 m/min |
| Table speed: | 20 m/min |
| Cut-in size: | $\Delta^R 20$ μm/pass |
| Total cut-in size: | 5 mm |
| Grinding width: | 10 mm |
| Spark-out: | 1 pass |
| Grinding oil: | Dry type (no oil used) |
| Dressing condition: | Single stone diamond dressor |
|  | Cut-in: $\Delta^R 20$ m/pass |
|  | Lead: 0.2 mm/r.o.w |
|  | Spark-out: None |

As a result, values shown in Table 8 were obtained for the grinding ratio, maximum electric power consumption (value excluding no-load power (0.4 kW)), and surface roughness.

TABLE 8

| Sample No. | Grinding Ratio (mm$^3$/mm$^3$) | Maximum Electric Power Consumption (kW/cm) | Surface Roughness (μRZ) 1 = 2.5, N = 3 |
|---|---|---|---|
| Example 17 | 58 | 1.2 | 14 |
| Example 18 | 55 | 1.2 | 15 |
| Example 19 | 66 | 1.1 | 12 |
| Example 20 | 58 | 1.3 | 15 |
| Comp. Ex. 19 | 35 | 1.3 | 18 |
| Comp. Ex. 20 | 10 | 1.7 | 18 |

As shown in Table 8, the grinding wheel using the abrasive grain of the present invention has a grinding ratio by 6 times as much as the grinding ratio of the commercially available single crystal alumina abrasive grain 32A of Comparative Example 20, and by about 2 times as much as the grinding ratio of the grinding wheel of Comparative Example 19 using a trace grade abrasive grain as described in Japanese Patent Publication JP-A-60-231462. Thus, the grindability is greatly improved compared with the conventional products. In spite of the improved grindability, the maximum electric power consumption is equivalent to or lower than the comparative examples, and the surface roughness is several steps better than the comparative examples. In addition, the burn of work piece, which occurs in Comparative Example 20 extremely frequently and in Comparative Example 19 relatively frequently, did not occur at all in Examples 17 to 20 of the present invention. In view of various grinding performances, it is understood that the products of the present invention are an abrasive grain and a grinding wheel unsurpassed by any conventional products.

EXAMPLES 22 TO 24

Resorcinol (10 parts) was dissolved in 10 parts of ethanol, and the resulting solution was mixed with 100 parts of one of three abrasive grains of Examples 3, 4 and 8. The mixture was dried at 100° C. for 1 hour to remove ethanol by evaporation. As a result, three kinds of abrasive materials whose surfaces were coated with resorcinol were obtained.

The phenol resin bond BRL-2867 (about 70 wt % solid, product by Showa Kobunshi Co.) was evenly coated on a compressed non-woven fabric base material at a coverage of 100 g/m², and then the coated abrasive materials were spread out and excess abrasive material was removed. The three kinds of abrasive materials were deposited on the base material each in an amount of 250/m². These sheets were dried at 80° C. for 4 hours, and thereafter the bond was coated evenly in a proportion of 200 g/m², and then dried at 80° C. for 4 hours. The temperature was then raised from 80° C. to 135° C. in 2 hours, retained at 135° C. for 30 minutes, and three kinds of coated abrasives were thus obtained.

COMPARATIVE EXAMPLE 21

In relation to the abrasive grain of Comparative Example 1, coated abrasives with a non-woven fabric base material were produced in the same manner as in Examples 22 to 24.

EXAMPLE 25

The coated abrasives of Examples 22 to 24 and Comparative Example 21 were punched to form 180ϕ discs (180 mm in diameter), which were then used as dry grinders under the following test conditions.

TABLE 9

| Test Conditions | |
| --- | --- |
| Sander: | Hitachi PHD-180C |
| Grinding time: | 1 min. × 10 grindings |
| Material to be ground: | (a) SPC  10 × 250 × t |
| | (b) SUS.304 9 × 250 × t |
| Load: | 3 LBS |

As a result, the grinding values as shown in Tables 10 and 11 were obtained.

TABLE 10

| | Grinding of SPC | | |
| --- | --- | --- | --- |
| Sample No. | Initial Grinding Amount (g/min) | 9–10 Minutes Grinding Amount (g/min) | Total Grinding Amount (g/min) |
| Example 22 | 22.6 | 6.7 | 130.3 |
| Example 23 | 17.1 | 5.8 | 123.0 |
| Example 24 | 10.9 | 11.6 | 170.8 |
| Comparative Example 21 | 19.0 | 3.3 | 96.1 |

TABLE 11

| | Grinding of SUS.304 | | |
| --- | --- | --- | --- |
| Sample No. | Initial Grinding Amount (g/min) | 9–10 Minutes Grinding Amount (g/min) | Total Grinding Amount (g/min) |
| Example 22 | 6.1 | 2.5 | 33.7 |
| Example 23 | 5.1 | 2.8 | 35.3 |
| Example 24 | 5.6 | 2.5 | 33.3 |
| Comparative Example 21 | 4.9 | — | 6.2 |

The reason why Table 11 lacks figures for 9–10 minute grinding amounts in Comparative Example 21 is that the materials to be ground started a burn in 4 minutes, the ground amount had fallen to an extremely low value, and the grinding therefore had to be stopped.

The performances of the products of the present invention showed a total grinding amount by from 1.3 to 1.8 times as much as that of the coated abrasive using a trace grade abrasive grain described in Japanese Patent Publication JP-A-60-231462 according to Comparative Example 21 in the case where the material to be ground was cold press steel plate SPC as will be understood from Table 10, and also showed a total grinding amount by even from 5.4 to 5.7 times as much as that of the conventional product in the case where the material to be ground was stainless steel SUS.304 as will be understood from Table 11. Therefore, the products of the present invention showed a remarkable improvement over the conventional products.

INDUSTRIAL APPLICABILITY

The products obtained according to the present invention are useful as an ultrafine crystalline sintered ceramics material having a high hardness and a high density and an abrasive material such as an abrasive grain, a grinding wheel or an coated abrasive. Therefore, the present invention is useful in the field of grinding and polishing.

We claim:

1. An α-alumina-based ceramic comprising crystals of a particle diameter in a range from 0.03 to 0.30 μm inclusively and an average particle diameter of no greater than 0.2 μm, and having a density of no lower than 95% of a theoretical density and a Vickers hardness of no lower than 2,000 kg/mm².

2. An alumina-based abrasive grain comprising said α-alumina-based ceramic as claimed in claim 1.

3. An abrasive material comprising said alumina-based abrasive grain as claimed in claim 2.

4. An α-alumina-based ceramic as claimed in claim 1, wherein said α-alumina-based ceramic contains at least one oxide of at least one of Fe, Cu, Ni, Ba, Be, Mg, Cr, Si, Mn, Zr, Ti, Ca, V, Ga, and Rh, the amount of said oxide being no more than 20 wt % of said α-alumina-based ceramic.

5. An aluminum-based abrasive grain comprising said α-alumina-based ceramic as claimed in claim 4.

6. An abrasive material comprising said alumina-based abrasive grain as claimed in claim 5.

7. A method for the production of an α-alumina-based ceramic having a use as an abrasive grain, said α-alumina-based ceramic comprising crystals of a particle diameter in a range from 0.03 to 0.30 μm inclusively and an average particle diameter of no greater than 0.2 μm, by gelling an alumina sol containing fine α-alumina crystal grains, heating the gelled product to 900° C., subsequently increasing the temperature of the product from 900° C. to 1,100° C. in less than 90 seconds, and subsequently retaining the product at a temperature between 1,000° C. and 1,300° C. wherein the retention time is from 30 seconds to 10 minutes in the case where the retention temperature is in the range of from 1,200° to 1,300° C., from 10 minutes to 10 hours in the case where the retention temperature is in a range of from 1,100° to 1,200° C., and from 10 hours to 100 hours in the case where the retention temperature is in a range of from 1,000° to 1,100° C.

8. A method as claimed in claim 7, wherein said gelled product further contains at least one oxide or precursor thereof of at least one of Fe, Cu, Ni, Ba, Be, Mg, Cr, Si, Mn, Zr, Ti, Ca, V, Ga, and Rh, so that the amount of said at least one oxide and oxide of said precursor in said α-alumina-based ceramic is no more than 20 wt %.

9. A method for the production of an α-alumina-based ceramic having a use as an abrasive grain, said α-alumina-based ceramic comprising crystals of a particle diameter in a range from 0.03 to 0.30 μm inclusively and an average particle diameter of no greater than 0.2 μm, by a two-step sintering method comprising gelling an alumina sol containing fine α-alumina crystal grains, heating the gelled product from a temperature substantially near room temperature to 900° C., subsequently increasing the temperature of the product from 900° C to 1,100° C. in less than 90 seconds, and subsequently retaining the product at a temperature between 1,100° C. and 1,300° C., for from 30 seconds to 10 minutes, and further retaining the product at a temperature between 1,100° C. and 1,200° C. for from 1 to 100 hours.

10. A method as claimed in claim 9, wherein said gelled product further contains at least one oxide or precursor thereof of at least one of Fe, Cu, Ni, Ba, Be, Mg, Cr, Si, Mn, Zr, Ti, Ca, V, Ga, and Rh, so that the amount of said at least one oxide and oxide of said precursor in said α-alumina-based ceramic is no more than 20 wt %.

* * * * *